US007152036B2

(12) United States Patent
Gizzio

(10) Patent No.: US 7,152,036 B2
(45) Date of Patent: Dec. 19, 2006

(54) METHOD AND APPARATUS FOR MATCHING PETS TO APPROPRIATE PET PRODUCTS AND SUPPLIES

(76) Inventor: Jill Gizzio, 882 S. Matlack St., West Chester, PA (US) 19382

( * ) Notice: Subject to any disclaimer, the term of this patent is extended or adjusted under 35 U.S.C. 154(b) by 648 days.

(21) Appl. No.: 09/881,527

(22) Filed: Jun. 14, 2001

(65) Prior Publication Data

US 2003/0046092 A1 Mar. 6, 2003

(51) Int. Cl.
*G06Q 99/00* (2006.01)
(52) U.S. Cl. ......................................................... 705/1
(58) Field of Classification Search ...................... 705/1
See application file for complete search history.

(56) References Cited

U.S. PATENT DOCUMENTS 6,156,355 A * 12/2000 Shields et al. ................. 426/74
6,358,546 B1 * 3/2002 Bebiak et al. ............... 426/232

FOREIGN PATENT DOCUMENTS

JP 2001309753 A * 11/2001

OTHER PUBLICATIONS www.iams.com retrieved from wayback machine Mar. 3, 2000.*
www.petsmart.com; retrieved from wayback machine any linkage Dec. 6, 2000.*

* cited by examiner

*Primary Examiner*—John G. Weiss
*Assistant Examiner*—Traci L Smith
(74) *Attorney, Agent, or Firm*—Patricia A. Wenger

(57) ABSTRACT

The present invention is a method and apparatus for matching pets, particularly dogs and cats, with an appropriate product by a pet owner. A breed code is assigned to each breed of pet based on predetermined criteria. Pet products and supplies are classified based on the suitability of the product for pets of various breed codes. The breed codes assigned to each breed and breed codes assigned to each product are published and made available to the consumer so that a pet owner may make an informed decision in purchasing a product for a pet.

2 Claims, 4 Drawing Sheets

METHOD AND APPARATUS FOR MATCHING PETS TO APPROPRIATE PET PRODUCTS AND SUPPLIES

BACKGROUND OF THE INVENTION

1. Field of the Invention

The invention is a method and apparatus allowing a consumer to select Pet products and supplies appropriate for a specific breed of domestic pet.

2. Description of the Related Art

Domestic pets of all sizes and activity levels require safe and suitable products in their daily lives. Appropriate Pet products and supplies can help to satisfy both a pet's maintenance needs and their exercise, amusement, and socialization requirements.

Many pet owners become deeply attached to their pets, and are willing to spend considerable money providing for their maintenance and care. The industry serving these pet owners is large and diverse. A significant portion of the pet industry is devoted to manufacturing supplies to maintain, nurture, amuse and occupy pets.

The diversity of Pet products and supplies for pets available on the market is matched only by the diversity of the animals themselves. Pets differ in size, personality, and exercise requirements. Products appropriate for one pet may be entirely inappropriate for another pet. The prior art provides no guidance to the pet owner as to which products are appropriate for the owner's pet. An inappropriate pet product cannot be properly used by the animal and is a waste of money for the pet owner. At worst, an inappropriate pet product can present a hazard to the pet, such as an increased likelihood of the animal ingesting and choking on or experiencing intestinal blockage from the product.

The prior art does not teach a systematic classification system to assist the pet owner in determining whether a particular pet product is appropriate for the owner's pet.

SUMMARY OF THE INVENTION

The present invention provides systematic classification systems of pets and pet products to allow a pet owner to make an appropriate selection for the owner's pet.

In the present invention, indicia are assigned to a breed of pet. The indicia comprise one or more marks or designations that serve to differentiate one breed of animal from another, such as numbers, letters, words, symbols, colors, sounds, odors, any combination of the foregoing, or any other means of differentiation. In the preferred embodiment, the indicia comprise a "breed code" consisting of a single numeral.

Many different methods can be used to assign a breed code to a particular breed. For dogs, one method is based on an evaluation of the weight of the typical adult of the breed and based on the degree of activity or activity level of the breed. Other factors also may be considered, such as the group to which a dog belongs, the dog's weight and height, size and shape of the dog's jaw and many other possible factors. For purposes of this application, a "group" is a classification of dog breeds based on the purposes for which the breeds originally were developed. For cats, one method for assigning the breed code is based on the temperament and need for attention of the particular breed of cat. A single breed code may apply to several breeds of pets.

A pet product is evaluated to determine for what breed codes it would be appropriate. The evaluation of the product may be based on the experience of the manufacturer or others, or may be empirical, as by exposing the product to animals categorized within the various breed codes to determine by which animals the product is accepted. The breed code for each breed is then published, as is the list of appropriate breed codes for the product. The pet owner may thereby learn the breed code applicable to his or her particular pet and may choose a product from those Pet products and supplies having an identical breed code. The pet owner thereby may select a product knowing that there is an increased likelihood that the product will be safe, suitable, and useable by the owner's pet.

The breed codes appropriate to a particular product may be published by placing the breed codes on the packaging of the individual pet product, on the pet product itself, or in any other location convenient to the pet owner.

DESCRIPTION OF THE PREFERRED EMBODIMENT

Indicia are assigned to a breed of pet, such a breed of dog or cat. In the preferred embodiment, the indicia comprise a numerical breed code. Pet products and supplies are categorized to determine for what pets having a breed code a product having an identical breed code is appropriate. Finally, the breed code assigned to a particular breed and list of Pet products and supplies categorized by breed code are published. Publication of the breed codes and publication of the list of Pet products and supplies categorized by breed code informs a pet owner as to whether a particular product is appropriate for a particular pet.

Figure 1:
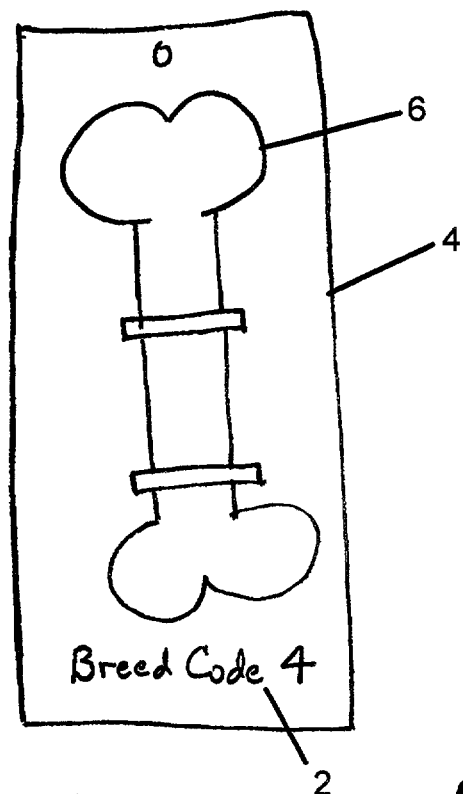
FIG. 1 is a product attached to retail display packaging.
Figure 2:
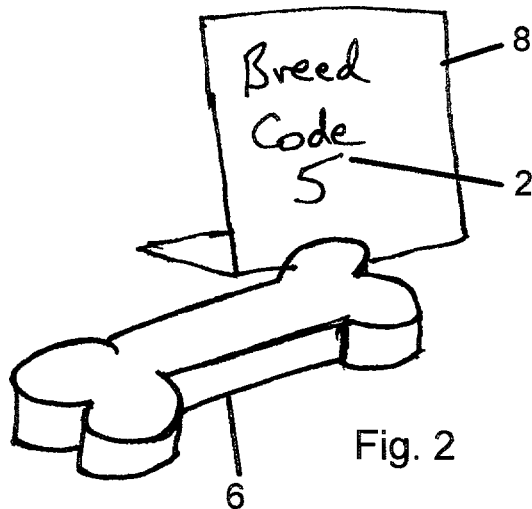
FIG. 2 is a retail display with breed code information.
Figure 3:
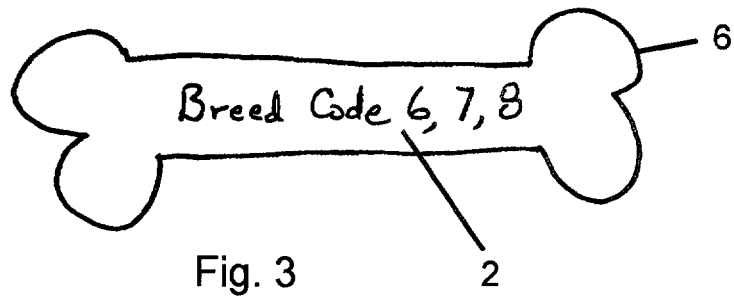
FIG. 3 is a product marked with a breed code.

As shown by FIG. 1 the publication of the breed code categories 2 for which a product is appropriate need not appear as a list and may appear on the container or packaging 4 of a product 6. As shown by FIG. 2, the publication of the breed code categories 2 may be in the form of labeling, advertising, or any other means 8 in the proximity of a product 6. The publication of the breed code categories 2 may appear on the product itself 6 FIG. 3, as by printing, embossing or creation of a raised pattern. Also as shown by FIG. 3, a single product 6 may be suitable for pets belonging to several breed codes 2.

Figure 4:
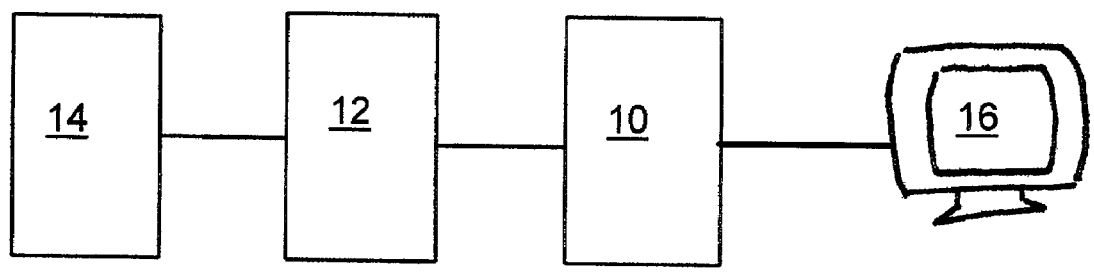
FIG. 4 illustrates a computer network implementing the present invention.

Publication of the breed codes and publication of the list of pet products and supplies categorized by breed code may be implemented by computer or other communication device. As shown by FIG. 4, a user instructs a client computer 10 to request information from a server computer 14. The client computer 10 sends the request through a computer network 12, which may be the Internet. The server computer 14 receives the request. The server computer 14 transmits information through the computer network 12 to the client computer 10, where a display 16 exhibits the information to the user. The information transmitted by the server computer 14 to the client computer 10 may comprise the identification of a product 6 and publication of the breed codes categories 2 for which the product 6 is appropriate.

For the purposes of this application, a client computer 10 is any device capable of requesting information over a computer network 12 and displaying 16 received information to the user. For the purposes of this application, a server computer 14 is any device capable of delivering information to a client computer 10 over a computer network 12.

Any suitable method may be used to assign indicia to a breed of pet. Dogs and cats can be categorized in any of many possible ways, including without limitation: age of the animal, dimensions of various features of the animal, weight of the animal, bone structure, the size of the jaw, chewing temperament, athleticism, exercise needs, group, breed, personality characteristics, taste and odor preferences, and any other factors that assist in predicting behavior and preferences. Any such categorization is contemplated by this application. Although the present method assigns a single breed code to all pets of that breed, it is contemplated that multiple indicia could be assigned to pets of the same breed based on weight, age or other characteristics or for the purpose of matching the breed with Pet products and supplies of different types, such as chewing Pet products and supplies and fetching Pet products and supplies.

The indicia may comprise a breed code assigned to a breed and an identical breed code used to designate an appropriate product. The indicia assigned to the breed and the product may not be identical, but may correspond one to another; as, for example and without limitation, a first color assigned to a breed and a second color assigned to Pet products and supplies appropriate for pets of that breed.

For the purposes of this application, a "breed" of pet, such as a dog or cat, is a relatively homogenous group of animals identified by experts. Pets of a particular breed, such as breeds of dog recognized by the American Kennel Club, share characteristics of weight, jaw size and shape, activity level and personality characteristics. The breed of a dog provides a reasonable estimation of the needs of that dog. A pet product appropriate to one dog of a particular breed likely will be appropriate to most dogs of the same breed.

The starting point for the determination of breed codes for dogs is identifying the breed and determining the weight and exercise requirements of each breed of dog. The "breeds" of dog are those recognized by the American Kennel Club. The weight of each breed is the ideal weight of an adult dog of the breed as published by the American Kennel Club. The exercise requirement is based on information obtained from published sources; namely the Encyclopedia of Dogs by D. Caroline Coile, Ph.D., published by Barron's, ISBN 0-7641-5097-0, and is based on the activity expected from typical dogs of each breed.

An exercise factor is derived for each breed of dogs, as shown by Table 1. The exercise requirement is an assigned value of 1 through 5, with one being a very low exercise requirement and five being a very high exercise requirement. The exercise factor is derived from the exercise requirement.

TABLE 1

| Exercise Requirement | Exercise Factor |
|---|---|
| 0–1 | 1 |
| 2–5 | 2 |

A weight factor is derived based on the ideal weight for an adult dog of the breed as shown in Table 2. As an example and as shown on Table 2, a breed of dog with an ideal adult weight of 10 pounds is assigned a weight factor of 0.

TABLE 2

| Weight in lbs. | Weight Factor |
|---|---|
| 0–10 | 0 |
| 11–16 | 2 |
| 17–35 | 3 |
| 36–45 | 4 |
| 46–70 | 5 |
| 71–80 | 6 |
| 81 and above | 7 |

Figure 5:
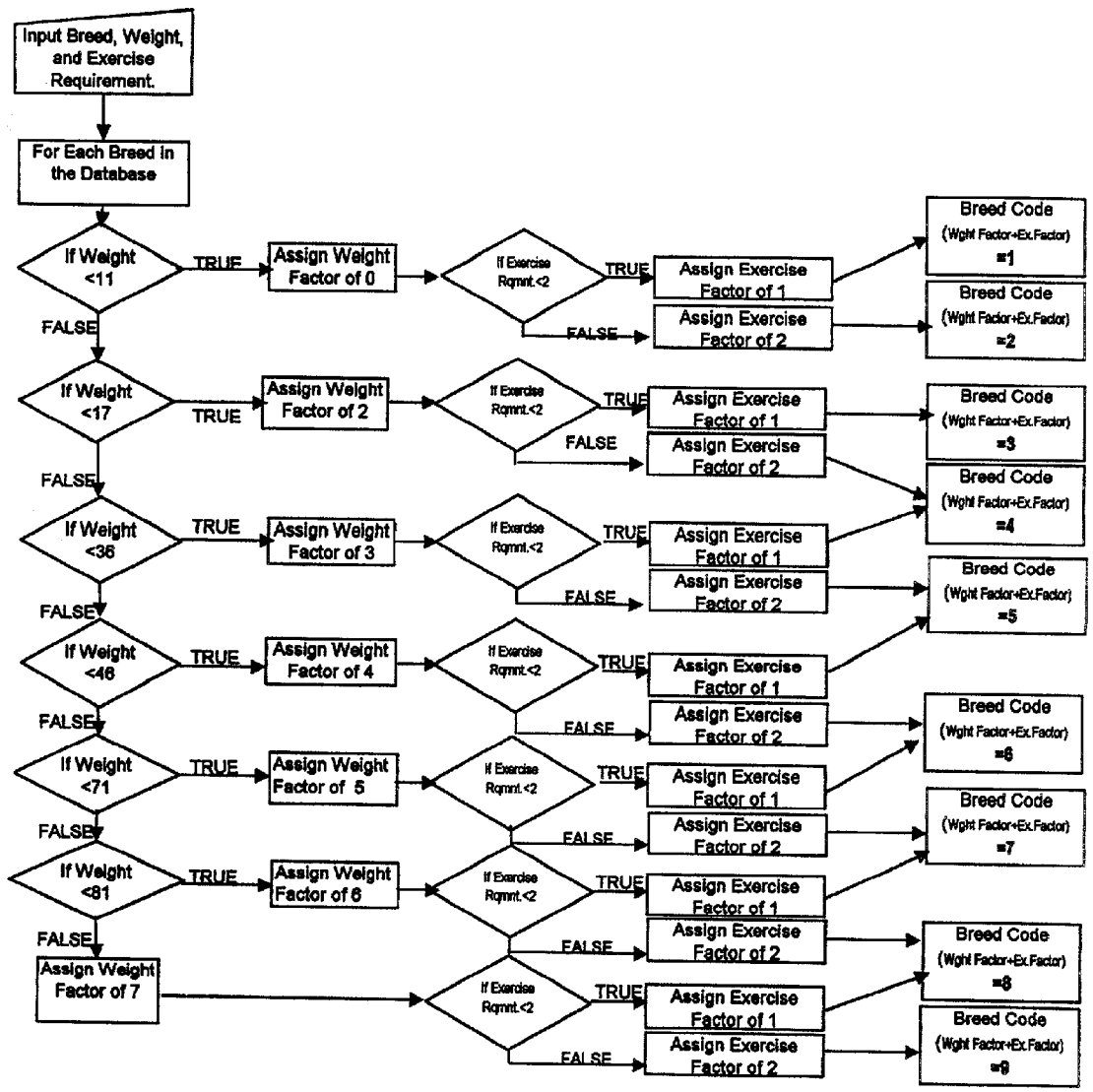
FIG. 5 is a flow chart for one method of determining breed code for dogs.

To calculate the breed code for a breed of dog, the exercise factor for that breed is added to the weight factor for the breed. The sum is the breed code. FIG. 5 is a flow chart showing the calculation of breeds codes by summing the exercise factor and the weight factor. Each breed is entered into the database. The weight of each breed is entered into the database. The exercise requirement for each breed is entered into the database. The exercise requirement is converted into an exercise factor and combined with the weight factor to yield the breed code. Table 3 below is the result of the summation of exercise factor and weight factor for several breeds of dogs recognized by the American Kennel Club. Included in table 3 are the breed, group name, weight, activity requirement, exercise factor, weight factor and resulting breed code. The breeds are grouped in the table by breed code.

TABLE 3

Breed Code Determination

| Breed | Group | Weight | Exercise | Exercise Factor | Weight Factor |
|---|---|---|---|---|---|
| Breed Code: 1 | | | | | |
| Chihuahua | Toy | 5 | 1 | 1 | 0 |
| Coton De Tulear | Toy | 8 | 1 | 1 | 0 |
| English Toy Spaniel | Toy | 10 | 1 | 1 | 0 |
| Japanese Chin | Toy | 5 | 1 | 1 | 0 |
| Maltese | Toy | 5 | 1 | 1 | 0 |
| Papillon | Toy | 10 | 1 | 1 | 0 |
| Pekingese | Toy | 10 | 1 | 1 | 0 |
| Pomeranian | Toy | 5 | 1 | 1 | 0 |
| Breed Code: 2 | | | | | |
| Affenpinscher | Toy | 9 | 3 | 2 | 0 |
| American Eskimo Toy | Non-Sporting | 8 | 3 | 2 | 0 |
| Bichon Frise | Non-Sporting | 10 | 2 | 2 | 0 |
| Brussels Griffon | Toy | 9 | 2 | 2 | 0 |
| Chinese Crested | Toy | 8 | 2 | 2 | 0 |
| Dachshund Mini & Toy | Toy | 10 | 2 | 2 | 0 |
| Fox Terrier -Toy | Toy | 5 | 3 | 2 | 0 |
| Manchester Terrier Toy | Toy | 8 | 2 | 2 | 0 |
| Miniature Pinscher | Toy | 9 | 2 | 2 | 0 |
| Schipperke mini | Toy | 10 | 3 | 2 | 0 |
| Silky Terrier | Toy | 10 | 2 | 2 | 0 |
| Toy Poodle | Toy | 6 | 2 | 2 | 0 |
| Yorkshire Terrier | Toy | 7 | 2 | 2 | 0 |
| Breed Code: 3 | | | | | |
| Lhasa Apso | Non-Sporting | 14 | 1 | 1 | 2 |
| Lowchen | Non-Sporting | 15 | 1 | 1 | 2 |
| Pug | Toy | 16 | 1 | 1 | 2 |
| Shih Tzu | Toy | 13 | 1 | 1 | 2 |

TABLE 3-continued

Breed Code Determination

| Breed | Group | Weight | Exercise | Exercise Factor | Weight Factor |
|---|---|---|---|---|---|
| Breed Code: 4 | | | | | |
| American Eskimo Mini | Non-Sporting | 15 | 3 | 2 | 2 |
| Australian Terrier | Terrier | 12 | 3 | 2 | 2 |
| Border Terrier | Terrier | 15 | 3 | 2 | 2 |
| Boston Terrier | Non-Sporting | 20 | 1 | 1 | 3 |
| Bulldog French *special need | Non-Sporting | 25 | 1 | 1 | 3 |
| Cairn Terrier | Terrier | 14 | 3 | 2 | 2 |
| Cavalier King Charles Spaniel | Toy | 15 | 3 | 2 | 2 |
| Havanese *wght | Toy | 13 | 3 | 2 | 2 |
| Italian Greyhound | Toy | 13 | 2 | 2 | 2 |
| Jack Russell Terrier | Terrier | 15 | 4 | 2 | 2 |
| Miniature Schnauzer | Terrier | 14 | 3 | 2 | 2 |
| Norfolk Terrier | Terrier | 12 | 3 | 2 | 2 |
| Norwich Terrier | Terrier | 12 | 3 | 2 | 2 |
| Poodle mini | Non-Sporting | 15 | 3 | 2 | 2 |
| Schipperke | Non-Sporting | 15 | 3 | 2 | 2 |
| Tibetan Spaniel | Non-Sporting | 12 | 2 | 2 | 2 |
| Breed Code: 5 | | | | | |
| American Eskimo Dog | Non-Sporting | 30 | 3 | 2 | 3 |
| Basenji | Hound | 25 | 3 | 2 | 3 |
| Basset Hound | Hound | 45 | 1 | 1 | 4 |
| Beagle | Hound | 25 | 3 | 2 | 3 |
| Bedlington Terrier | Terrier | 20 | 3 | 2 | 3 |
| Bulldog English *special need | Non-Sporting | 45 | 1 | 1 | 4 |
| Cardigan Welsh Corgi | Herding | 35 | 2 | 2 | 3 |
| Cocker Spaniel | Sporting | 30 | 3 | 2 | 3 |
| Dachshund *wght | Hound | 30 | 2 | 2 | 3 |
| Dandie Dinmont Terrier | Terrier | 21 | 3 | 2 | 3 |
| English Cocker Spaniel | Sporting | 35 | 3 | 2 | 3 |
| Finnish Spitz | Non-Sporting | 30 | 3 | 2 | 3 |
| Fox Terrier Smooth & Wire | Terrier | 20 | 3 | 2 | 3 |
| Foxhound American | Hound | 24 | 4 | 2 | 3 |
| Irish Terrier | Terrier | 25 | 3 | 2 | 3 |
| Lakeland Terrier | Terrier | 20 | 3 | 2 | 3 |
| Manchester Terrier | Terrier | 22 | 3 | 2 | 3 |
| Miniature Bull Terrier | Terrier | 29 | 3 | 2 | 3 |
| Pembroke Welsh Corgi | Herding | 25 | 3 | 2 | 3 |
| Petit Basset Griffon Vendeen | Hound | 35 | 3 | 2 | 3 |
| Puli | Herding | 30 | 3 | 2 | 3 |
| Scottish Terrier | Terrier | 20 | 3 | 2 | 3 |
| Sealyham Terrier | Terrier | 23 | 2 | 2 | 3 |
| Shetland Sheepdog | Herding | 20 | 3 | 2 | 3 |
| Shiba Inu | Non-Sporting | 25 | 3 | 2 | 3 |
| Skye Terrier | Terrier | 20 | 2 | 2 | 3 |
| Soft Coated Wheaten Terrier | Terrier | 35 | 3 | 2 | 3 |
| Staffordshire Bull Terrier | Terrier | 35 | 3 | 2 | 3 |
| Tibetan Terrier | Non-Sporting | 25 | 3 | 2 | 3 |
| Welsh Terrier | Terrier | 35 | 3 | 2 | 3 |
| West Highland White Terrier | Terrier | 20 | 3 | 2 | 3 |
| Whippet | Hound | 30 | 3 | 2 | 3 |
| Breed Code: 6 | | | | | |
| Airedale Terrier | Terrier | 45 | 3 | 2 | 4 |
| American Water Spaniel | Sporting | 40 | 3 | 2 | 4 |
| Australian Cattle Dog | Herding | 40 | 5 | 2 | 4 |
| Border Collie | Herding | 40 | 5 | 2 | 4 |
| Brittany | Sporting | 40 | 5 | 2 | 4 |
| Field Spaniel | Sporting | 45 | 4 | 2 | 4 |
| Ibizan Hound | Hound | 45 | 3 | 2 | 4 |
| Keeshond | Non-Sporting | 40 | 3 | 2 | 4 |
| Kerry Blue Terrier | Terrier | 40 | 3 | 2 | 4 |
| Norwegian Elkhound | Hound | 45 | 3 | 2 | 4 |
| Schnauzer Standard | Working | 40 | 3 | 2 | 4 |
| Sussex Spaniel | Sporting | 40 | 3 | 2 | 4 |
| Welsh Springer Spaniel | Sporting | 45 | 3 | 2 | 4 |
| Breed Code: 7 | | | | | |
| Afghan Hound | Hound | 60 | 3 | 2 | 5 |
| American Staffordshire | Terrier | 60 | 3 | 2 | 5 |
| Australian Shepherd | Herding | 50 | 5 | 2 | 5 |
| Bearded Collie | Herding | 50 | 4 | 2 | 5 |
| Belgian Malinois | Herding | 65 | 5 | 2 | 5 |
| Belgian Sheepdog same | Herding | 65 | 5 | 2 | 5 |
| Boxer | Working | 65 | 3 | 2 | 5 |
| Bull Terrier | Terrier | 55 | 3 | 2 | 5 |
| Canaan Dog | Herding | 50 | 4 | 2 | 5 |
| Chesapeake Bay Retriever | Sporting | 70 | 3 | 2 | 5 |
| Chinese Shar-pei | Non-Sporting | 55 | 3 | 2 | 5 |
| Chow Chow | Non-Sporting | 60 | 2 | 2 | 5 |
| Clumber Spaniel | Sporting | 60 | 2 | 2 | 5 |
| Collie | Herding | 65 | 3 | 2 | 5 |
| Curly-Coated Retriever | Sporting | 70 | 3 | 2 | 5 |
| Dalmatian | Non-Sporting | 55 | 3 | 2 | 5 |
| English Setter | Sporting | 65 | 4 | 2 | 5 |
| English Springer Spaniel | Sporting | 50 | 4 | 2 | 5 |
| Flat-Coated Retriever | Sporting | 70 | 3 | 2 | 5 |
| Foxhound English | Hound | 65 | 4 | 2 | 5 |
| German Shorthaired Pointer | Sporting | 70 | 5 | 2 | 5 |
| German Wirehaired Pointer | Sporting | 60 | 5 | 2 | 5 |
| Golden Retriever | Sporting | 70 | 3 | 2 | 5 |
| Gordon Setter | Sporting | 70 | 4 | 2 | 5 |
| Greyhound | Hound | 65 | 3 | 2 | 5 |
| Harrier | Hound | 55 | 4 | 2 | 5 |
| Irish Setter | Sporting | 55 | 5 | 2 | 5 |
| Irish Water Spaniel | Sporting | 55 | 3 | 2 | 5 |
| Italian Spinoni | Sporting | 70 | 3 | 2 | 5 |
| Labrador Retriever | Sporting | 70 | 3 | 2 | 5 |
| Pharaoh Hound | Hound | 55 | 4 | 2 | 5 |
| Plott Hound | Hound | 65 | 3 | 2 | 5 |
| Pointer | Sporting | 60 | 4 | 2 | 5 |
| Poodle standard | Non-Sporting | 50 | 4 | 2 | 5 |
| Portuguese Water Dog | Working | 55 | 4 | 2 | 5 |
| Saluki | Hound | 60 | 3 | 2 | 5 |
| Samoyed | Working | 55 | 3 | 2 | 5 |
| Siberian Husky | Working | 50 | 4 | 2 | 5 |
| Vizsla | Sporting | 65 | 3 | 2 | 5 |
| Weimaraner | Sporting | 70 | 5 | 2 | 5 |
| Wirehaired Pointing Griffon | Sporting | 60 | 4 | 2 | 5 |
| Breed Code: 8 | | | | | |
| Alaskan Malamute | Working | 80 | 4 | 2 | 6 |
| Black and Tan Coonhound | Hound | 75 | 4 | 2 | 6 |
| Doberman Pinscher | Working | 80 | 3 | 2 | 6 |
| Komondor | Working | 75 | 3 | 2 | 6 |
| Old English Sheepdog | Herding | 80 | 3 | 2 | 6 |
| Rhodesian Ridgeback | Hound | 80 | 3 | 2 | 6 |
| Schnauzer Giant | Working | 80 | 4 | 2 | 6 |

TABLE 3-continued

Breed Code Determination

| Breed | Group | Weight | Exercise | Exercise Factor | Weight Factor |
|---|---|---|---|---|---|
| Breed Code: 9 | | | | | |
| Akita | Working | 90 | 3 | 2 | 7 |
| Anatolian Shepherd | Working | 120 | 3 | 2 | 7 |
| Bernese Mountain Dog | Working | 100 | 2 | 2 | 7 |
| Bloodhound | Hound | 100 | 3 | 2 | 7 |
| Borzoi | Hound | 85 | 3 | 2 | 7 |
| Bouvier Des Flandres | Herding | 85 | 4 | 2 | 7 |
| Briard | Herding | 85 | 4 | 2 | 7 |
| Bullmastiff | Working | 120 | 2 | 2 | 7 |
| German Shepherd Dog | Herding | 85 | 4 | 2 | 7 |
| Great Dane | Working | 110 | 3 | 2 | 7 |
| Great Pyrenees | Working | 90 | 3 | 2 | 7 |
| Great Swiss Mountain Dog | Working | 110 | 3 | 2 | 7 |
| Irish Wolfhound | Hound | 110 | 3 | 2 | 7 |
| Kuvasz | Working | 100 | 4 | 2 | 7 |
| Mastiff | Working | 180 | 2 | 2 | 7 |
| Newfoundland | Working | 150 | 2 | 2 | 7 |
| Otterhound | Hound | 90 | 3 | 2 | 7 |
| Rottweiler | Working | 110 | 3 | 2 | 7 |
| Saint Bernard | Working | 165 | 2 | 2 | 7 |
| Scottish Deerhound | Hound | 90 | 3 | 2 | 7 |

As illustrated by Table 3, the characteristics of pets of a particular breed are determined in part by the purpose for which a particular breed was originally developed. For dogs, those purposes are divided into seven groups, as follows.

a. Dogs of the sporting group were bred for hunting and retrieving. Dogs of this group have a keen sense of smell and may be swimmers.

b. The hound group includes two branches. The sight hounds were bred for sighting and chasing prey. Scent hounds, which tend to be larger dogs, were bred to locate prey by scent.

c. The working group includes guard dogs, military dogs, pack dogs, life-saving dogs, fighting dogs, police dogs, companion dogs and sled dogs.

d. Dogs of the terrier group were bred for hunting prey in burrows.

e. The Toy group includes dogs bred for size as companion dogs. Dogs of this group were derived from the hound, sporting and terrier groups.

f. The non-sporting group is a catch all for dogs not included in the other groups.

g. The herding group was bred for assistance in corralling animals and protecting them from predators.

A breed code may be assigned for a breed of cat. A temperament factor is assigned to each breed based on the characteristics of the breed; namely, the activity level of the breed. A cat's need-for-attention factor also is assigned to each breed based on the characteristics of the breed. The need-for-attention of the breed is based on the need of cats in the breed for interaction with humans. The temperament factor and need-for-attention factor are summed to obtain the breed code for a breed of cat.

Figure 6:
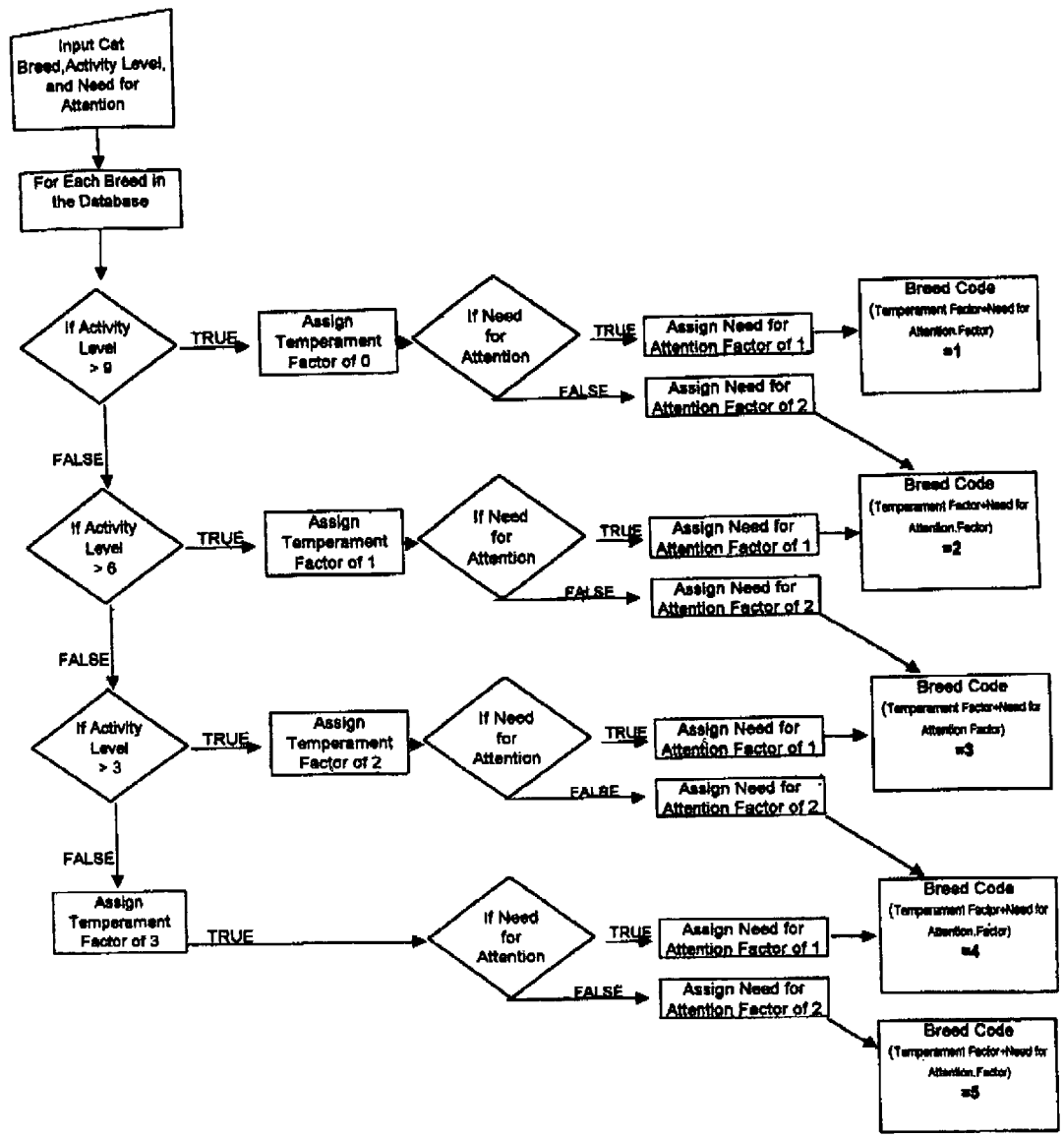
FIG. 6 is a flow chart for one method of determining breed code for cats.

FIG. 6 is a flow chart showing the calculation of breed codes by summing the temperament factor and the need for attention factor.

What is claimed is:

1. A method of matching a pet, said pet being a dog with an appropriate product comprising the steps of:
   a. assigning a breed code to a plurality of breeds of a pet based on predetermined criteria, said predetermined criteria comprises;
   assigning an exercise factor to each of said breeds of said dog;
   assigning an exercise factor to each of said breeds of dog and
   combining said exercise factor to each of said weight factor in a predetermined manner to determine breed code
   b. categorizing a product to determine whether the product is appropriate for said plurality of breeds of said dog assigned to said breed code;
   c. publishing said assignment of said breed code and said categorization of said product to allow a customer to appropriately match the said product to said breeds of said pet.

2. The method of claim 1, said weight factor being a numerical weight factor and said exercise factor being a numerical exercise factor, said predetermined manner for combining said exercise factor and said weight factor comprising addition of said exercise factor and said weight factor.

* * * * *